Dec. 15, 1931.  B. KATZFEY  1,836,666
STALK CUTTER
Filed Dec. 16, 1930  2 Sheets-Sheet 1
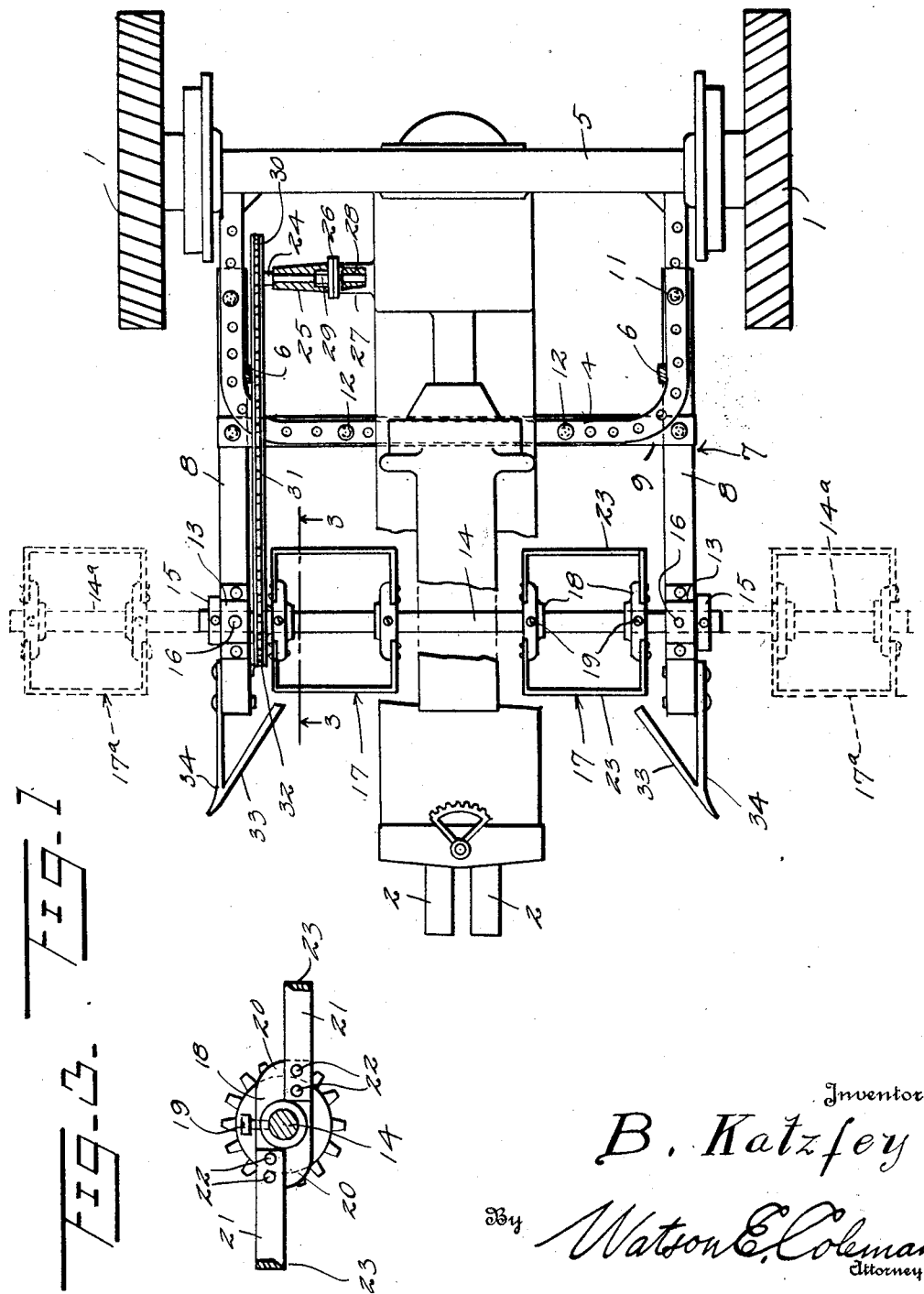
Inventor
B. Katzfey
By Watson E. Coleman
Attorney

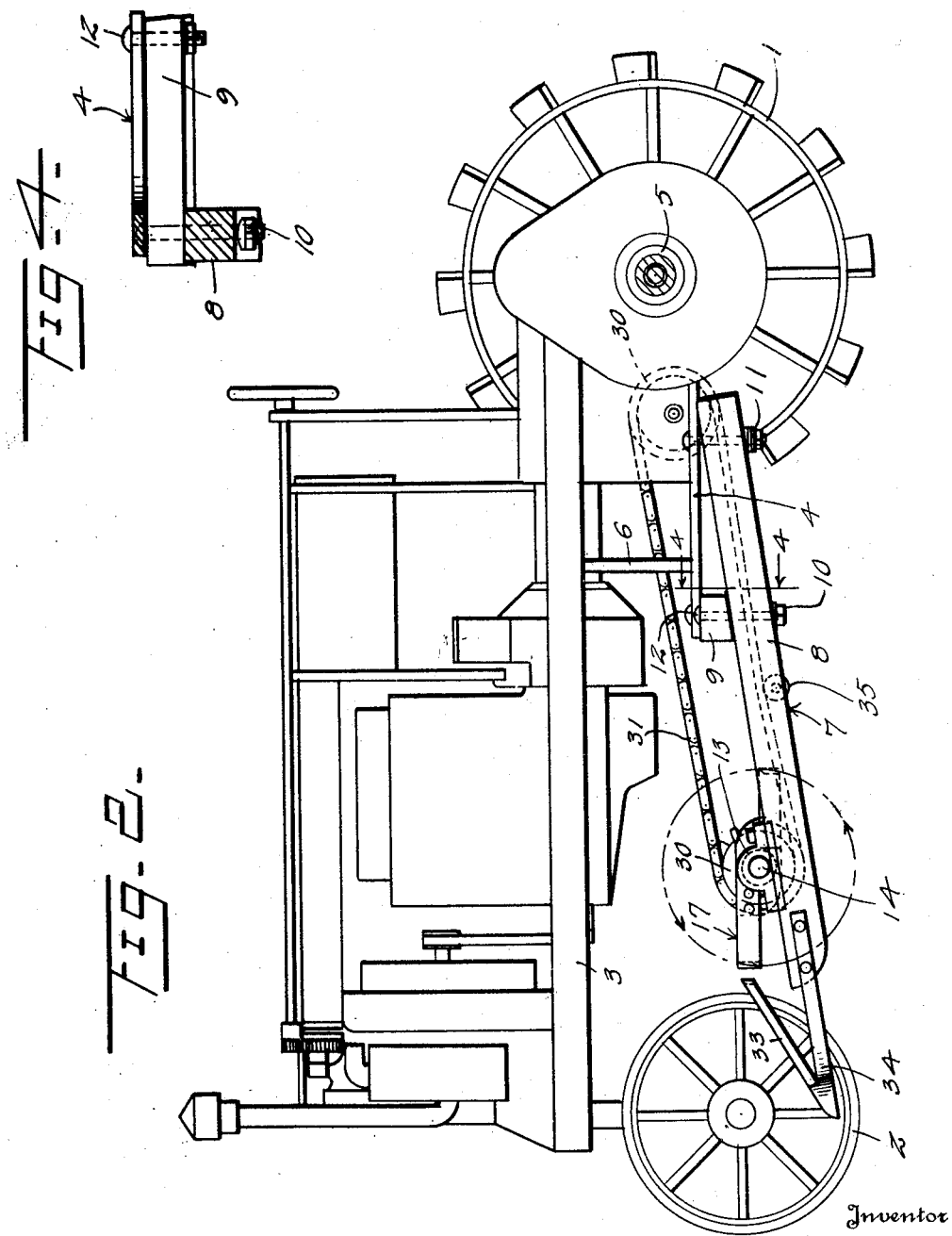

Patented Dec. 15, 1931

1,836,666

UNITED STATES PATENT OFFICE

BERNARD KATZFEY, OF GEORGE WEST, TEXAS

STALK CUTTER

Application filed December 16, 1930. Serial No. 502,815.

This invention relates to stalk cutters, and has for one of its objects to provide a novel machine of this character which shall be adapted to cut green and dead stalks of any length, which shall be adapted to cut the stalks close to the ground, and which shall be adapted to cut the stalks into comparatively short pieces and spread the pieces so that they may be plowed into the ground.

The invention has for a further object to provide a machine of the character stated which shall be adapted to be suspended from a tractor with the cutting mechanisms thereof arranged rearwardly of and laterally beyond the front or steering wheels of the tractor, to the end that a plurality of rows of stalks may be simultaneously cut.

The invention has for a further object to provide a machine of the character stated wherein the cutting mechanisms thereof shall be adapted to be rotated at rapid speed from the power take off shaft of the tractor.

The invention has for a still further object to provide a machine of the character stated which shall be simple, durable and capable of being manufactured and sold at a comparatively low cost, and which shall be adapted to be readily applied to or removed from a tractor.

With the foregoing and other objects in view, the nature of which will appear as the description proceeds, the invention consists in the construction, combination and arrangement of parts hereinafter fully described and claimed, and illustrated in the accompanying drawings, wherein:—

Figure 1 is a top plan view illustrating the stalk cutter applied to a tractor, the tractor being shown more or less diagrammatically.

Figure 2 is a view in side elevation of the stalk cutter and tractor.

Figure 3 is a sectional view taken on the vertical plane indicated by the line 3—3 of Figure 1, and Figure 4 is a sectional view taken on the vertical plane indicated by the line 4—4 of Figure 2.

Referring in detail to the drawings, 1 designates the rear or driving wheels, 2 the front or steering wheels, 3 the chassis, and 4 the draw bar of a tractor. The steering wheels 2 are located close to the longitudinal center of the tractor, and the draw bar 4, which is of U-form in plan, is located below the chassis 3 and extends forwardly from the rear axle housing 5 of the tractor. The rear ends of the draw bar 4 are secured to the axle housing 5, and the draw bar is secured near its front ends to the chassis 3 by hangers 6. As the tractor is of well-known construction, a further description of the same is deemed unnecessary.

The stalk cutter comprises a frame 7 which consists of side bar 8 and a cross bar 9. The cross bar 9 occupies a position rearwardly of the transverse center of the frame 7 and rests at its ends upon the side bars 8, the bars being secured together by bolts 10. The frame 7 is located beneath the chassis 3, and is secured to the draw bar 4 in a downwardly and forwardly inclined position with respect thereto. The rear ends of the side bars 8 contact with the under sides of the side members of the draw bar 4, and are secured to said draw bar members by bolts 11. The cross bar 9 contacts with the under side of the cross member of the draw bar 4, and is secured to said draw bar member by bolts 12. The cross bar 9 occupies a position between the draw bar 4 and the side bars 8, and due thereto, maintains the frame in its downwardly and forwardly inclined position with respect to the draw bar.

The side bars 8 are located in vertical planes situated laterally outward of the steering wheels 2, and the front ends of the side bars 8 are located in a vertical plane situated rearwardly of the steering wheels. Bearings 13 are secured to the upper sides of the side bars 8 near the front ends of the latter. A shaft 14 extends from one of the side bars 8 to the other and is journaled in the bearings 13. The shaft 14 is held against endwise displacement from the bearings 13 by collars 15 which are secured to the ends of the shaft in contact with the outer sides of the bearings. The bearings 13 are provided with grease cups 16 which may be of any well-known or appropriate construction.

Cutting mechanisms 17 are secured to the shaft 14 between the side bars 8, and the longitudinal center of the tractor and frame 7. The cutting mechanisms 17 extend outwardly from vertical planes located parallel to the outer lateral sides of the steering wheels 2, when such wheels are in forward position. Each of the cutting mechanisms 17 comprises collars 18 secured by set screws 19 in relatively spaced relation on the shaft 14. The collars 18 are each provided with diametrically opposed lugs 20 which extend radially outward therefrom. Arms 21 which are secured, as at 22, to the lugs 20, extend in opposite directions from the collars 18, and secured to the outer ends of the arms are blades 23, the arms and blades being preferably formed integrally.

A shaft 24 which is journaled in a bearing sleeve 25 secured, as at 26, to a bearing 27 of the take off shaft 28 of the tractor, is coupled, as at 29, to the take off shaft, and is provided with a sprocket wheel 30. A chain 31 passing about the sprocket wheel 30 and about a sprocket wheel 32 fixed to the shaft 14, establishes a driving connection between the shaft 24 and the shaft 14, to the end that the cutting mechanisms 17 may be rotated at a rapid speed.

Sweeps 33, which are secured to the front ends of the side bars 8 by bracket arms 34, extend upwardly, rearwardly and inwardly from points located forwardly and laterally beyond the side bars to points located forwardly of the paths of rotation of the outer ends of the blades 23, and serve to direct those stalks located directly in advance of the side bars into the paths of the blades. An idler 35 for the lower run of the sprocket chain 31 is journaled on one of the side bars 8.

From the foregoing description, taken in connection with the accompanying drawings, it will be understood that the cutting mechanisms 17 are driven at rapid speed, and that their location at opposite sides of the planes parallel to the outer lateral sides of the steering wheels 2 adapts the machine for cutting two rows of stalks. If desired, the shaft 14 may be extended outwardly beyond the side bars 8, as indicated at 14a, in Figure 1, and additional cutting mechanisms may be applied to the extended portions of the shaft, as indicated at 17a, in said figure, to the end that the machine may be adapted for cutting four rows of the stalks. During the operation of the cutting mechanisms 17, the blades 23 thereof pass close to the ground, with the result that the stalks are cut off even with the ground, and the rapid rotation of the cutting mechanisms results in the cutting of the stalks into small pieces and also results in the scattering of the pieces so that they may be worked into the ground by a middle buster plow, not shown, located rearwardly of and attached to the tractor.

While I have described the principle of the invention, together with the structure which I now consider the preferred embodiment thereof, it is to be understood that the structure shown is merely illustrative and that such changes may be made, when desired, as fall within the scope of the invention as claimed.

What is claimed is:—

1. A stalk cutter including a frame, a shaft extending transversely of and rotatably mounted on the frame, cutting mechanisms secured to the shaft at opposite sides of the longitudinal center of the frame, and sweeps secured to the frame and extending downwardly, forwardly and outwardly from points forwardly of and adjacent the outer sides of the cutting mechanisms.

2. In combination, a tractor having a draw bar located beneath the chassis thereof, a frame consisting of a cross bar secured to the under side of the draw bar and side bars located below the cross bar and secured thereto and to the draw bar, the cross bar maintaining the side bars in a downwardly and forwardly inclined position with respect to the draw bar, a shaft extending transversely of the frame and rotatably mounted upon the front end portions of the side bars, cutting mechanisms secured to the shaft at opposite sides of the longitudinal center of the tractor, sweeps secured to the front ends of the side bars, and means establishing a driving connection between the take off shaft of the tractor and said second shaft.

In testimony whereof I hereunto affix my signature.

BERNARD KATZFEY.